Jan. 5, 1960  J. H. ANDERSON  2,919,940
MEANS FOR FIXING HUBS ON SHAFTS
Filed March 30, 1955
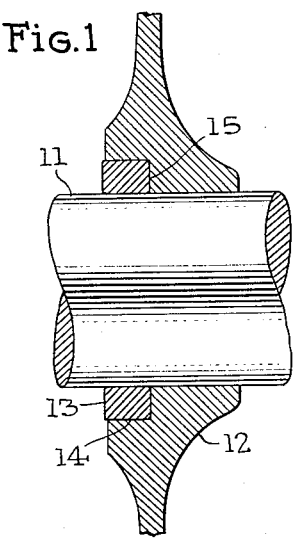
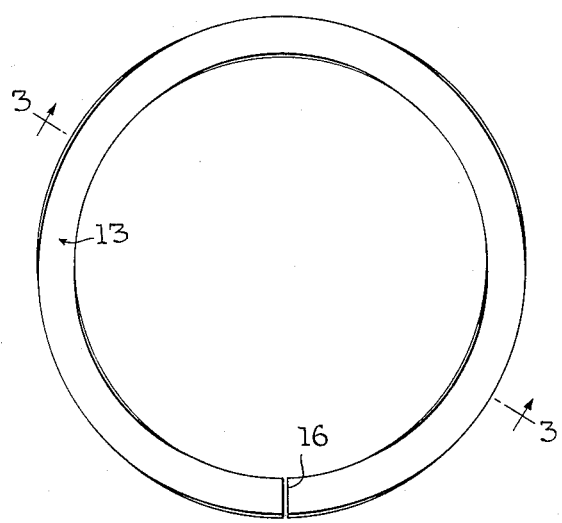
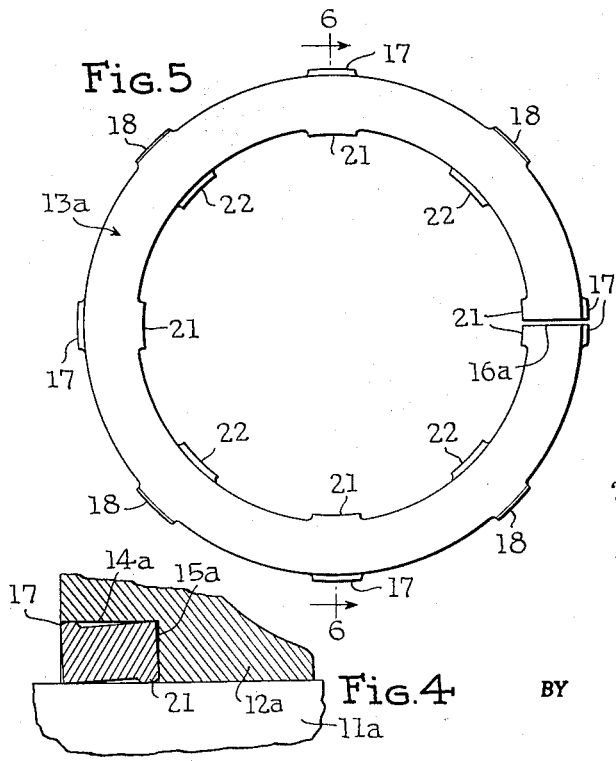
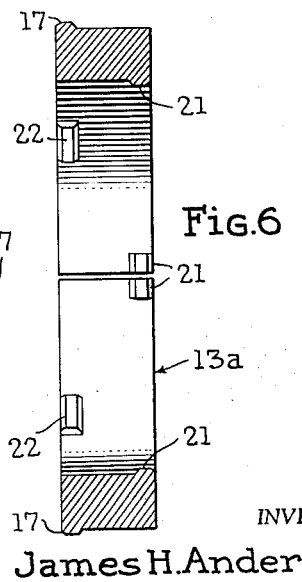
INVENTOR
James H. Anderson
BY
ATTORNEYS United States Patent Office 2,919,940
Patented Jan. 5, 1960

2,919,940

MEANS FOR FIXING HUBS ON SHAFTS

James H. Anderson, Spring Garden Township, York County, Pa., assignor, by mesne assignments, to Borg-Warner Corporation, Chicago, Ill., a corporation of Illinois Application March 30, 1955, Serial No. 497,850

10 Claims. (Cl. 287—52)

This invention relates to means for fixing hubs on shafts and particularly to means to fix rotary impellers and the like to rotary shafts. The invention affords adequate connection without the use of keys and keyways, and avails of the high unit pressures which can be developed by torsional elastic deformation. Prior art proposals involving the use of simple flexure have practical limitations which have greatly restricted their use. These arise from the fact that bow springs and the like necessarily act through relatively long lever arms, so that the unit pressures developed at points of contact are inadequate.

The invention proposes a torsionally deformed elastic unit which reacts through a very short effective lever arm and so develops high unit pressures but has sufficient range of action to compensate for differential expansion.

The absence of a keyway makes it possible to develop the full strength of the shaft. The hub may be located at any desired point in the length of the shaft. The locking ring acts to center the hub under all conditions. Thus the construction is light and inexpensive, and secures positive advantages without introducing any undesirable characteristics.

Two embodiments of the invention will now be described by reference to the accompanying drawing, in which:

Fig. 1 is a fragmentary view of a portion of a shaft in elevation with the hub portion of a runner in axial section, the hub being locked on the shaft by a torsion ring, also shown in axial section.

Fig. 2 is a face view on a larger scale than Fig. 1 of the preferred type of torsion ring in unstressed condition.

Fig. 3 is a section on the line 3—3 of Fig. 2.

Fig. 4 is a view similar to a portion of Fig. 1 showing the use of a modified type of torsion ring.

Fig. 5 is a face view of the torsion ring shown in Fig. 4, the ring being in unstressed condition.

Fig. 6 is a section on the line 6—6 of Fig. 5.

In Fig. 1 the shaft 11 carries the hub 12 of a turbine runner (or the like). This closely fits the shaft. Cut into one end of the hub, and encircling the shaft is a rectangular recess into which has been pressed a closely fitting torsion ring 13. The ring reacts inward against the shaft 11 and outward against the cylindrical surface 14 of the recess. In Fig. 1 the ring is illustrated in its stressed condition. It is then an approximately cylindrical ring of rectangular cross-section and substantially fills the annular space between the shaft 11 and surface 14. Close fit against surface 15 is relatively unimportant.

The ring 13 is shown in its unstressed condition in Figs. 2 and 3. It is a ring of rectangular cross-section, preferably split at 16, and formed as if each successive 60° arc of the ring were twisted similar amounts, but alternately in reverse directions. This conformation can be produced most conveniently by actual twisting of an initially cylindrical annulus, but it could be produced by machining. The form is one of two significant factors. The other factor is spring temper, tending to preserve the contours above described.

With the shaft 11 and hub 12 positioned, the ring 13 is pressed to place. The resultant untwisting of the twisted arcs of the ring develops the necessary locking forces.

Consider the unstressed ring as shown in Figures 2 and 3. The ring is rectangular in cross-section and desirably is approximately square. The reverse twisting above mentioned converts the edges into a series of reversely pitched helices, two of which in alternation with one another produce areas of intense inward pressure against the shaft. These are the two at the inner periphery of the ring. Similarly, the two helices at the outer periphery of the ring create alternating zones of intense outward pressure upon the hub.

Consideration of the above circumstances will make the second embodiment readily understandable. The ring 13a in its unstressed condition of Figs. 5 and 6 is a simple cylindrical ring rectangular in cross-section with a split 16a and a series of bosses, which correspond functionally with the areas of high unit pressure in Figs. 2 and 3. They are spaced in a 45° arc basis rather than 60° as is the case in Figs. 1 to 3.

The bosses are in four circumferential series, two external at opposite edges of the outer periphery and two internal, also at opposite edges of the inner periphery.

The bosses of one external series are indicated at 17 and the other at 18. They are staggered, i.e., they alternate circumferentially.

The bosses of the internal series 21 and 22 also are staggered, and each is paired with an external boss at the diagonally opposite edge. The pairing is clearly shown in the drawings, each boss 17 with a boss 21, and each boss 18 with a boss 22. The ring is spring tempered.

When the ring is pressed to position as indicated in Fig. 4, the bosses become the contact points and because of the staggered relations twist the ring 13a reversely in successive arcs 45° in extent, so that the effect is basically similar to that secured with the ring of Figs. 2 and 3.

To indicate that the invention is not limited to rings having a particular number of arcs subjected to reversing torsional reactions, Figs. 2 and 3 are drawn on a 60° basis, whereas Figs. 5 and 6 are drawn on a 45° basis. Generally stated, the arcs should be short so that the resilient action will be intense. With a shaft of very large circumference, the arc subtended by successively reversed twists can be made short by increasing the number of reversals. Thus the 60° arc basis of Figures 2 and 3 and the 45° arc basis of Figures 5 and 6 are to be considered illustrative and not limiting.

The two illustrated embodiments are functionally the same. The specific form of the bosses can be modified and the inner and outer series are not necessarily the same. For example, with an aluminum alloy runner on a steel shaft, the relative softness of the runner would make it desirable to use larger external bosses so that the unit pressure on the aluminum would not be excessive.

What is claimed is:

1. The combination of a cylindrical shaft; a hub having a bore which fits the shaft, the hub being mounted on the shaft; and means for fixing the hub to the shaft comprising an annular recess formed in the hub, encircling the shaft and having an outer bounding surface which is a cylinder coaxial with the shaft, a ring of highly elastic material substantially filling said recess, and means, rendered effective by forcing said ring into said recess, to stress said ring elastically in torsion in each of a series of successive arcs extending around the shaft, the directions of torsional stress being opposite to each other in successive arcs.

2. The combination defined in claim 1 in which the ring in its unstressed condition has a configuration such as would be produced by reversely twisting successive arcs of a ring of rectangular cross-section beyond its elastic limit.

3. The combination defined in claim 1 in which the ring in its unstressed condition has a configuration such as would be produced by reversely twisting successive arcs of a ring of rectangular cross-section beyond its elastic limit, and the ring has spring temper.

4. The combination defined in claim 1 in which the body of the ring is rectangular in cross-section and the inner and outer diameters of the body are such that it does not quite fill said recess, and the ring has along opposite edges of its internal and external peripheries respective series of staggered bosses which serve as the means to develop said torsional stresses.

5. The combination of a cylindrical shaft; a hub having a bore which fits the shaft, the hub being mounted on the shaft; and means for fixing the hub to the shaft comprising an annular bore formed in the hub, encircling the shaft and having an outer bounding surface which is a cylinder coaxial with the shaft, a ring of highly elastic material positioned within said bore, a first series of circumferentially arranged wedging surfaces alternately coacting between said outer bounding surface and the ring and between the shaft and the ring, and a second series of circumferentially arranged wedging surfaces similar to but axially displaced from said first series, the second series being so oriented relatively to the first series that each of its wedging surfaces is intersected by a plane which includes the axis of the shaft and which intersects one of the wedging surfaces of the first series and that one wedging surface of each pair so intersected coacts between the shaft and the ring and the other coacts between said outer bounding surface and the ring, whereby the ring is elastically stressed in torsion in each of a series of successive arcs extending around the shaft, the directions of torsional stress being opposite to each other in successive arcs.

6. The combination defined in claim 5 in which the body of the ring is rectangular in cross section and the inner and outer diameters of the body are such that it does not completely fill said annular bore, and the wedging surfaces are the surfaces of bosses formed integrally with said ring along opposite edges of its internal and external peripheries.

7. The combination defined in claim 5 in which the ring in its unstressed condition has a configuration such as would be produced by reversely twisting successive arcs of a ring of rectangular cross section beyond its elastic limit and wherein the wedging surfaces are the inner and outer surfaces of said ring in the regions of maximum deflection.

8. The combination defined in claim 7 in which the ring has spring temper.

9. The combination defined in claim 6 in which the ring is split.

10. The combination defined in claim 8 in which the ring is split.

References Cited in the file of this patent

UNITED STATES PATENTS

| 1,805,201 | Birmann | May 12, 1931 |
| 2,239,641 | Bierend | Apr. 22, 1941 |
| 2,800,800 | Dunn | July 30, 1957 |

FOREIGN PATENTS

| 123,195 | Switzerland | Nov. 1, 1927 |
| 613,632 | France | Aug. 28, 1926 |
| 940,797 | France | June 7, 1948 |
| 1,034,254 | France | Apr. 8, 1953 |